July 23, 1957 A. S. VAIL 2,800,029
VARIABLE DISPLACEMENT SINUSOIDAL DRIVE MECHANISM
Filed Aug. 31, 1956 3 Sheets-Sheet 1

INVENTOR
ALFRED S. VAIL
BY
*Julian C. Renfro*
ATTORNEY

July 23, 1957        A. S. VAIL        2,800,029

VARIABLE DISPLACEMENT SINUSOIDAL DRIVE MECHANISM

Filed Aug. 31, 1956        3 Sheets-Sheet 2

INVENTOR
ALFRED S. VAIL

BY
Julian C. Renfro
ATTORNEY

July 23, 1957 A. S. VAIL 2,800,029
VARIABLE DISPLACEMENT SINUSOIDAL DRIVE MECHANISM
Filed Aug. 31, 1956 3 Sheets-Sheet 3
FIG. 13
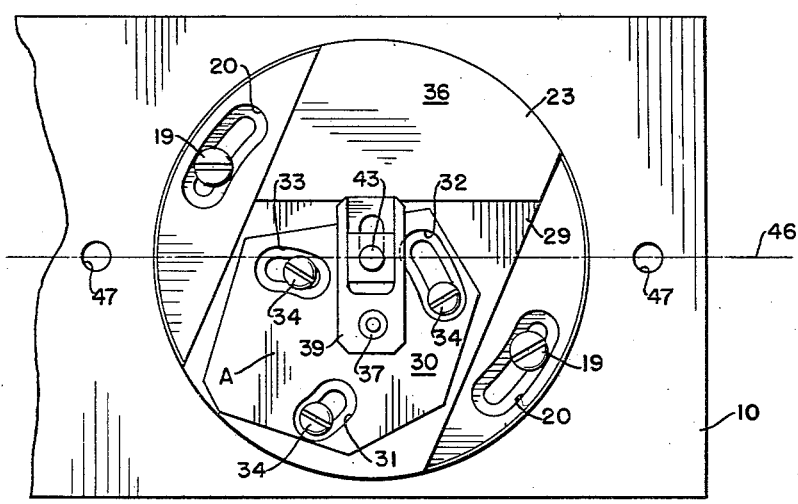
FIG. 14
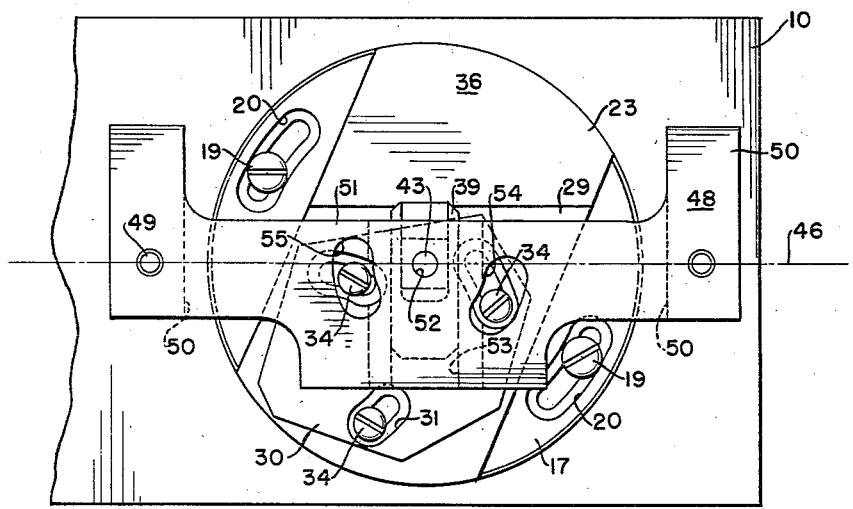
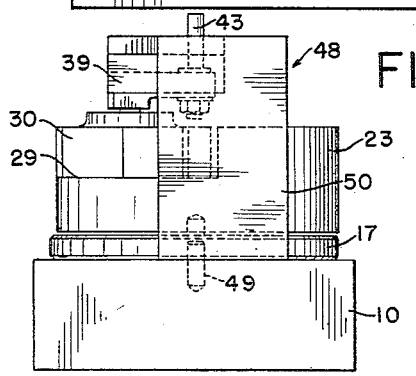
FIG. 15
INVENTOR
ALFRED S. VAIL
BY
Julian C. Renfro
ATTORNEY United States Patent Office 2,800,029
Patented July 23, 1957

2,800,029

VARIABLE DISPLACEMENT SINUSOIDAL DRIVE MECHANISM

Alfred S. Vail, Towson, Md., assignor to The Glenn L. Martin Company, Middle River, Md., a corporation of Maryland Application August 31, 1956, Serial No. 607,323

19 Claims. (Cl. 74—49)

The present invention relates to drive mechanism for converting rotary motion into linear movement of sinusoidally varying velocity, and more particularly to an improved sinusoidal drive mechanism in which means are provided for adjusting the stroke or amplitude of linear movement. By way of example only, the new drive mechanism is useful for driving such devices as phase shifters, linear potentiometers, antennae, or the like.

In connection with the actuation of certain control devices and other instrumentalities, it is sometimes desirable to provide for the linear movement of a part at sinusoidally varying velocity. This is conventionally accomplished by converting the rotary movement of an electric motor, for example, into a harmonic or sinusoidal linear movement. Heretofore, the various drive mechanisms employed for this purpose have been unsatisfactory in certain respects, particularly with regard to adjustability of the linear output movement. Accordingly, the present invention provides a sinusoidal drive mechanism of a novel and improved type having parts capable of quick adjustment for varying the stroke of the mechanism, while retaining the purely harmonic or sinusoidal linear output motion.

More specifically, the invention provides a novel and improved variable displacement sinusoidal drive mechanism which operates in the absence of sliding friction. Thus, while it has been possible heretofore to convert rotary to linear harmonic motion, through such classic mechanisms as the Scotch Yoke, all such prior mechanisms operate under substantial sliding friction, so that the various parts quicly become loose in their guides, substantially impairing the accuracy of the device. For this reason, such prior devices as the Scotch Yoke are not suitable for use with control instrumentalities requiring continued use with high accuracy.

In accordance with the invention, the new sinusoidal drive mechanism comprises a plurality of shafts, gears and crank arms arranged so that the effective free end of one of the crank arms moves at harmonically varying velocities along a fixed linear path. The various shafts may be journaled in an anti-friction manner, so that accuracy may be retained indefinitely, and the components of the drive system are connected together through a novel gearing system permitting adjustment of the effective lengths of the crank arms over a substantial range to vary the throw or amplitude of movement of the output element of the mechanism.

Another advantageous feature of the invention resides in the fact that external or spur gears are employed throughout, and the entire drive mechanism is arranged in a physically compact manner to facilitate the incorporation of the drive mechanism with other control equipment.

Other features and advantages of the invention will become apparent upon consideration of the following detailed description and accompanying drawing, in which.

Figure 1:
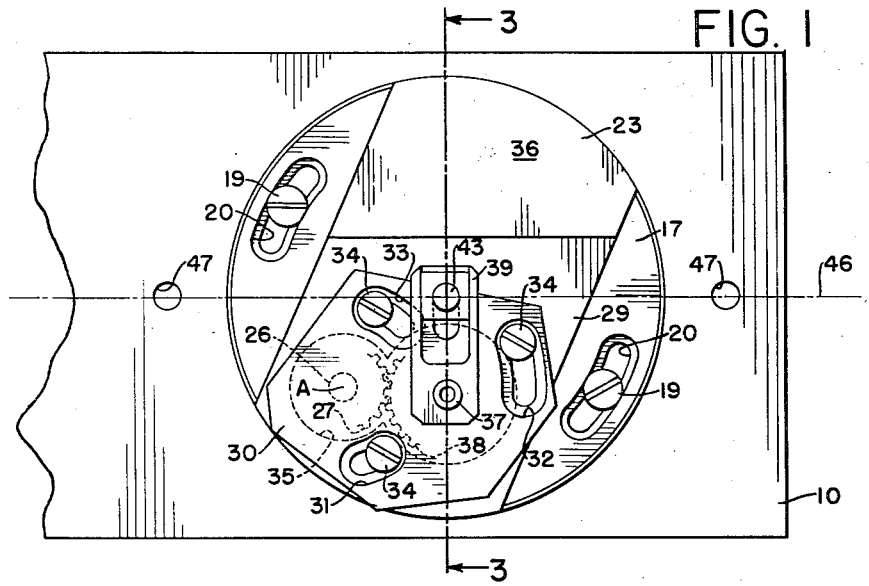
Fig. 1 is a top plan view of the new drive mechanism.
Figure 2:
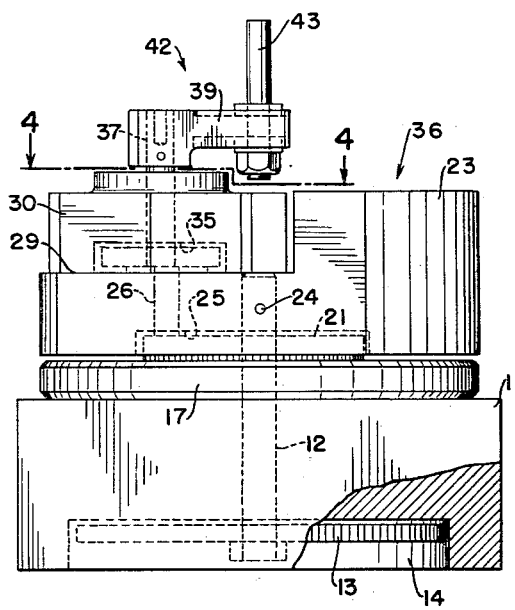
Fig. 2 is an end elevation of the drive mechanism of Fig. 1, with parts broken away.

Figs. 5-12, incl., are sequential schematic illustrations of the improved drive mechanism operating throughout a complete stroke;

Fig. 13 is a top plan view of the drive mechanism, similar to the view of Fig. 1, illustrating the mechanism as adjusted for a different amplitude of output movement;

Fig. 14 is a top plan view of the new drive mechanism, with a novel aligning and adjusting device in position thereon; and Fig. 15 is an end elevation of the new drive mechanism, with the aligning and adjusting device in position thereon.

Referring initially to Figs. 1-4, the new drive mechanism comprises a base block 10 having a vertical bore 11 therein supporting a primary shaft 12 for rotation. It is contemplated that the primary shaft 12, as well as other rotatable shafts of the drive mechanism, will be supported for rotation by suitable anti-friction bearings. However, for the purpose of clarity, such bearings are omitted from the present drawings.

Figure 3:
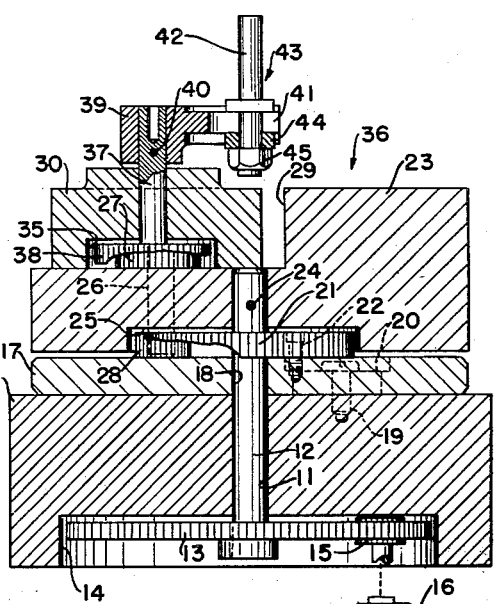
Fig. 3 is a cross-sectional view taken along line 3—3 of Fig. 1, with parts broken away.

In the illustrated form of the invention, the primary shaft 12 mounts a relatively large diameter spur gear 13 at its lower end, the base block 10 having a recess 14 therein in which the gear 13 is received. The gear 13 is engaged by a pinion 15 driven by a suitable motor 16 (see Fig. 3) whereby motive power may be applied to rotate the primary shaft 12. The upper end of the primary shaft 12 projects a substantial distance above the top of the base block 10, as shown in Fig. 3.

Secured to the upper surface of the base block 10, in concentric relation to the primary shaft 12, is an adjustment disc 17. The disc 17 has a central bore 18, through which the upper portion of the primary shaft 12 projects. In accordance with the invention, the adjustment plate 17 is adjustably secured to the base block 10, by means of screws 19 received in arcuate recessed slots 20 in the adjustment plate. The radii of the arcuate slots 20 originate at the axis of the bore 18, and permit the plate 17 to be rotated, within limits, about the axis of the shaft 12. Normally, the adjustment plate 17 is securely affixed to the base block 10. However, when adjustment is required, as will be more fully explained, the screws 19 may be loosened slightly to permit a limited rotational movement of the plate.

Rigidly secured to the adjustment plate 17, in concentric relation to the primary shaft 12, is a spur gear 21 of relatively large diameter. The gear 21 is affixed to the plate by suitable screws 22, and has a central opening containing an anti-friction bearing, through which the primary shaft 12 projects and is free to rotate.

At the upper end of the primary shaft 12 is a primary crank block 23, which is secured to the shaft 12 by means of a pin 24 and is rotatable with the shaft. The primary crank block 23 has a recess 25 in its lower surface, in which is received the large diameter primary gear 21. The arrangement is such that the lower surface of the crank block 23 lies close to the upper surface of the adjustment plate 17.

Figure 4:
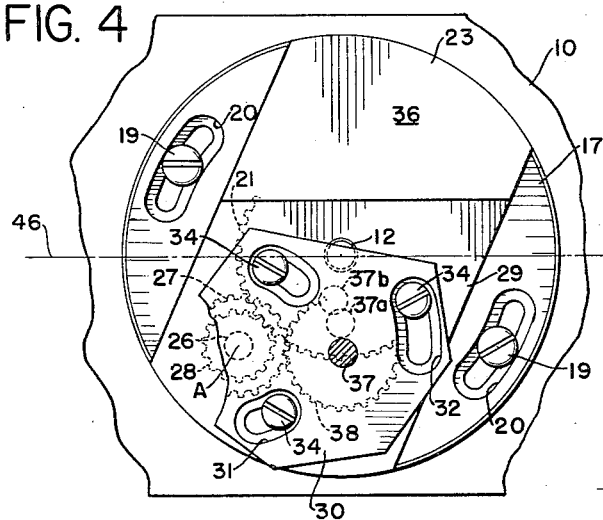
Fig. 4 is a fragmentary cross-sectional view, taken along line 4—4 of Fig. 2.

Supported for rotation in the primary crank block 23, in spaced parallel relation to the primary shaft 12, is an intermediate shaft 26 carrying upper and lower intermediate gears 27, 28, respectively at its ends. The intermediate shaft 26 is journaled in suitable anti-friction bearings, not shown, and is freely rotatable within the crank block 23. As indicated in Fig. 4, the lower intermediate gear 28 meshes with the relatively large diameter primary gear 21 fixed to the adjustment plate 17. Accordingly, upon rotation of the primary shaft and primary crank block 23, the intermediate shaft 26 and the upper intermediate gear 27 will be caused to rotate with respect to the crank block 23.

In the upper surface of the primary crank block 23 is an enlarged recess 29. The recess 29 has a flat upper surface upon which is mounted an adjustable support block 30. The support block 30 has a plurality of arcuate recessed slots 31—33 therein in which are received screws 34 which engage the primary crank block 23 and serve to secure the support block 30 thereto. In accordance with the invention, the radii of the arcuate slots 31—33 originate at a single point "A," which is directly aligned with the axis of the intermediate shaft 26. The support block 30 is normally affixed rigidly to the primary crank block 23 by the screws 34. However, limited rotational adjustment of the block 30 may be effected by loosening the screws 34 slightly and shifting the block 30 as permitted by the arcuate slots 31—33. In this respect, it will be understood that since the radii of the respective slots 31—33 originate at a single point "A," the point "A" will remain in a fixed position with respect to the primary crank block 23 in all adjusted positions of the support block 30. As shown in Fig. 3, the support block 30 has a recess 35 in its lower surface in which the upper intermediate gear 27 is received, so that the block 30 may lie in direct contact with the crank block 23. The support block 30 also has anti-friction bearing means, not shown, into which the upper end of the intermediate shaft 26 projects, forming an axis for the limited rotational adjustment of the block 30.

As will be more readily apparent upon consideration of the following portion of the description, the assembly comprising the primary crank block 23 and the support block 30 constitutes the primary crank arm of the drive mechanism. The primary crank arm as a complete assembly will be designated by the reference numeral 36.

Rotatably supported in the block 30 of the primary crank arm 36 is a secondary shaft 37. The shaft 37 is journaled in suitable anti-friction bearings, which have been omitted for the purpose of clarity, and has an upper portion projecting above the block 30 and a lower portion projecting into the recess 35 therein. Secured to the lower end portion of the secondary shaft 37 is a secondary gear 38 which meshes with the upper intermediate gear 27, as shown in Figs. 1 and 4. The relationship of the primary gear 21, intermediate gears 27, 28, and the secondary gear 38 is such that relative rotation between the primary crank arm 36 and the primary gear 21 will cause relative rotation between the primary crank arm 36 and the secondary shaft 37 at a speed twice that of the relative rotation between the arm 36 and gear 21. The gears are also arranged so that the relative rotation between the secondary shaft 37 and primary arm 36 is in a direction opposite to that between the primary arm 36 and primary gear 21.

At the upper end of the secondary shaft 37 is a secondary crank arm 39, which is secured to the shaft 37 by means of a pin 40. The secondary crank arm 39 has a recess or slot 41 in its outer or free end in which is received a crank pin assembly 42. The crank pin assembly 42 comprises a shouldered pin 43 having a threaded lower end portion upon which is received a suitable washer 44 and nut 45. The shouldered pin 43 is arranged to slide freely along the recess 41, which is aligned along a radial axis intersecting the axis of the secondary shaft 37, and may be secured at any point by tightening of the nut 45. In the illustrated apparatus, the crank pin 43 constitutes the output element of the drive, and is adapted to be operatively connected to a device, not shown, to be driven along a linear path at harmonically varying speeds.

To illustrate the operation of the improved sinusoidal drive mechanism, reference may be made to Figs. 5–12, inclusive, which indicate, in sequence, the respective positions of various components of the mechanism during its travel during a single complete stroke.

Figure 5:
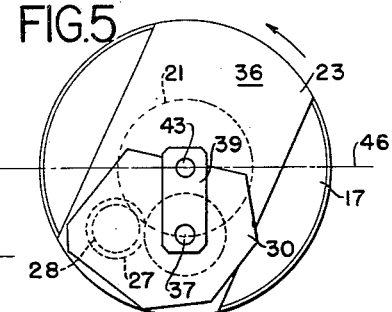

Referring initially to Fig. 5, the numeral 46 designates a linear axis along which the output element of the drive mechanism is to be translated. The axis 46 intersects the axis of the primary shaft 12, as will be readily apparent.

When the mechanism is in the indicated starting position, the axis of the crank pin 43 coincides with that of the primary shaft 12, and the principal axis of the secondary crank arm 39 lies at right angles to the axis of translation 46. When the primary shaft 12 is rotated, by means of the motor 16 or other device, the primary crank arm 36 is caused to rotate. In the illustrated sequence, the rotation of the primary crank arm is in a counterclockwise direction.

As the primary crank arm 36 rotates in a counterclockwise direction, the lower intermediate gear 28 is moved around the primary gear 21, so that the intermediate shaft 26 is caused to rotate with respect to the crank arm 36 through a number of revolutions for each revolution of the primary crank arm 36. As will be understood, the rotation of the intermediate shaft 26 will be counterclockwise with respect to the primary crank arm 36.

When the intermediate shaft 26 is rotated, the upper intermediate gear 27 drives the secondary gear 38 in a clockwise direction with respect to the primary crank arm 36. The secondary gear 38, of course, carries the secondary shaft 37 and secondary crank arm 39, and the latter are accordingly rotated clockwise with respect to the primary crank arm 36.

The relationship of the various gears 21, 27, 28, and 38 is, as described heretofore, such that for each counterclockwise revolution of the primary crank arm 36 with respect to the base block 10 the secondary crank arm 39 is caused to make two clockwise revolutions with respect to the primary crank arm 36. Thus, for each counterclockwise revolution of the primary crank arm 36 with respect to the base block 10, the secondary crank arm 39 makes one clockwise revolution with respect to the base block.

Figure 6:
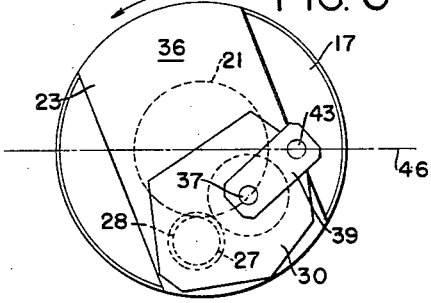
Figure 7:
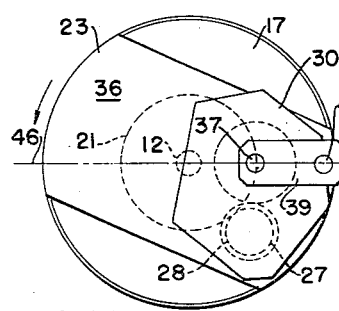
Figure 8:
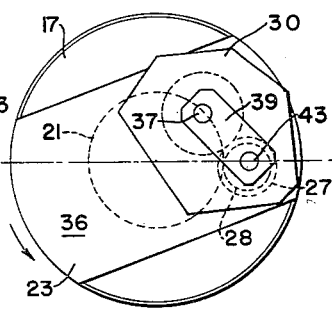
Figure 9:
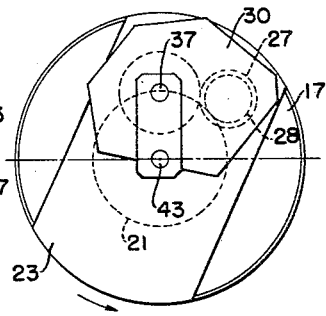
Figure 10:
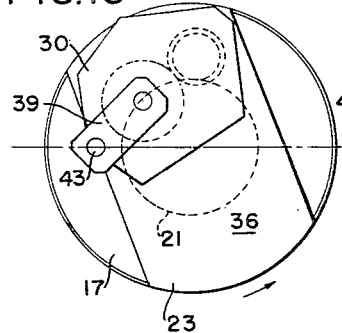

Referring now to Fig. 6, the primary crank arm 36 is illustrated as displaced 45 degrees in a counterclockwise direction from its starting position as indicated in Fig. 5. The secondary crank arm 39 has rotated 90 degrees with respect to the primary crank arm 36, and 45 degrees with respect to the base block 10, all in a clockwise direction. It will be observed in Fig. 6 that the crank pin 43 lies along the axis 46 but is at this time displaced a substantial linear distance from its starting point. In Fig. 7 the primary crank arm 36 has been displaced 90 degrees from its starting position, so that the axis of the secondary shaft 37 lies along the axis of translation 46. The crank pin 43 still lies along the axis 46, and is in a position of maximum throw, the throw being the distance between the axes of the primary and secondary shafts 12, 37 plus the distance between the secondary shaft and the crank pin 43. Figs. 8–12 indicate further successive positions of the respective primary and secondary crank arms 36, 39, and it will be observed that the crank pin 43 at all times lies along the axis of translation 46.

It may be readily demostrated by simple equations that the velocity of the crank pin 43 along the axis of translation 46 follows a harmonic or sinusoidal pattern. However, it is not believed to be necessary to set forth such mathematical relationships in this description, since the described form of harmonic translation is old in the broad sense.

Figure 11:
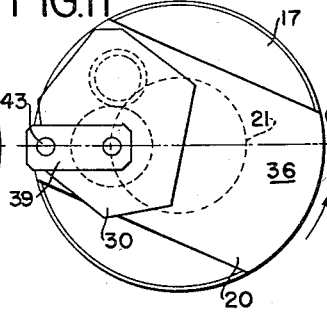
Figure 12:
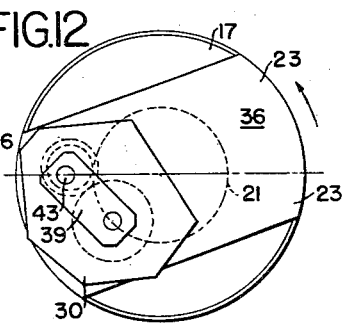

Referring particularly to Figs. 7 and 11, illustrating opposite positions of maximum throw of the crank pin 43, it will be readily observed that the total throw or amplitude of movement of the crank pin is equal to twice the distance between the axes of the primary and secondary shafts 12, 37 plus twice the distance between the axes of the secondary shaft 37 and crank pin 43. In accordance with the present invention, the amplitude of movement of the crank pin 43 may be adjusted by varying the respective distances before mentioned. It is necessary, of course, that the distance from the secondary shaft 37 to the crank pin 43 be at all times equal to the distance between the primary and secondary shafts 12, 37, in order to retain the linear harmonically varying output translation. Accordingly, means must be provided for adjusting both distances in an equal manner.

Adjusting the distance between the axes of the secondary shaft 37 and the crank pin 43 is readily accomplished by loosening the nut 45 and sliding the crank pin assembly 42 toward or away from the axis of the secondary shaft 37. As will be understood, the adjusted distance between the axes of the shaft 37 and crank pin 43 will constitute exactly one-fourth of the desired total amplitude of crank movement.

In accordance with the invention, the distance between the primary and secondary shafts 12, 37 is adjusted by movement of the support block 30 with respect to the primary crank block 23. To this end, the screws 34 are loosened slightly and the support block 30 is moved as permitted by the arcuate slots 31—33. As heretofore explained, the radii of the slots 31—33 originate at the point "A," which lies along the axis of the intermediate shaft 26, so that any adjusting movement of the support block 30 is a rotary movement about the axis of the intermediate shaft 26. Accordingly, as will be apparent in Figs. 1 and 4, adjustment of the block 30 will cause the axis of the secondary shaft 37 to be moved toward or away from the axis of the primary shaft 12, while the distance between the intermediate and secondary shafts 26, 37 remains constant. The upper intermediate gear 27, therefore, remains meshed with the secondary gear 38 regardless of the adjusted position of the block 30.

In connection with the adjustment of the block 30 with respect to the main crank block 23, it will be understood that the axis of the secondary shaft 37 moves in an arcuate path, as distinguished from a straight line path toward and away from the axis of the primary shaft 12. With the block 30 in the adjusted position shown in Fig. 1, the secondary shaft 37 lies a maximum distance from the primary shaft 12, and the mechanism is arranged for maximum throw. When the mechanism is adjusted to decrease the amplitude of crank pin movement, the block 30 is rotated in a counterclockwise direction to carry the axis of the secondary shaft 37 through an arcuate path to a position closer to the primary shaft 12. For example, in Fig. 4, the reference numerals 37a, 37b indicate intermediate and minimum throw adjusted positions of the secondary shaft 37.

By way of example, it shall be assumed that the drive mechanism is arranged for maximum throw, as illustrated in Figs. 1 and 4, and that it is desired to adjust the mechanism from minimum throw. The crank pin assembly 42 is first secured in a minimum throw position, and then the adjustment block 30 is rotated counterclockwise to move the secondary shaft 37 into the position indicated at 37b. In this respect, it will be observed that while the shaft 37, in the position of maximum throw, was disposed along an axis lying at right angles to the axis of translation 46 and intersecting the axis of primary shaft 12, the secondary shaft, in the position of minimum throw, is displaced to the left of such axis. Moreover, during the rotational adjustment of the block 30 the upper intermediate gear 27 and secondary gear 38 are meshed, and the gear 37 and secondary crank arm 39 will rotate in a counterclockwise direction. Thus, in order to re-align the mechanism for operation along the translational axis 46 the screws 19 are loosened to permit rotation of the adjustment disc 17. The disc 17, mounting the primary gear 21, is rotated slightly in a clockwise direction to drive the secondary crank arm 39, through the intermediate gears 27, 28, and secondary gear 38 into a position in which the axis of the crank pin 43 coincides with the axis of the primary shaft 12. Concurrently with the movement of the adjusting disc 17, or prior thereto, the shaft 12 is rotated slightly in a counterclockwise direction, so that the secondary shaft 37, in its adjusted position 37b, lies along the axis disposed at right angles to the translational axis 46 and intersecting the axis of the primary shaft 12. The final adjusted relation of the parts is illustrated in Fig. 13.

As will be understood from the preceding description the primary considerations in the adjustment of the amplitude of movement of the drive mechanism are that, in the final adjusted relation of the parts, the axis of the crank pin 43 coincides with that of the primary shaft 12 at a time when the axis of the secondary crank arm 39 is disposed along an axis at right angles to the translational axis 46 and intersecting the axis of the primary shaft 12. If this relationship does not exist, the desired linear harmonic output translation will not be realized. Accordingly, the present invention provides a novel and simplified arrangement for aligning the components of the drive mechanism in the proper relation whenever an adjustment is effected. To this end, the base block 10 is provided with a pair of vertical bores or openings 47 lying on opposite sides of the primary shaft 12 and disposed along the axis of translation 46. An aligning jig or device 48 is provided with spaced dowel pins 49 projecting downwardly from its base portions 50 and adapted to be received in the openings 47 when the aligning device is in a predetermined position with respect to the drive mechanism. Extending across the top of the base portions 50 of the aligning device is a spanning portion 51 in which is provided an opening 52 and channel-like recess 53. In accordance with the invention, the opening 52 lies along the axis extending between the dowel pins 49. The opening 52 is so spaced between the pins 49 that when the pins are received in the openings 47, the axis of the opening 52 coincides with that of the primary shaft 12 of the drive mechanism. The opening 52 is also of such size as to closely receive the crank pin 43. The channel or recess 53 in the aligning device is disposed in symmetric relation to the opening 52 and has its principal axis intersecting that of the opening 52 and lying at right angles to the axis extending between the dowel pins 49. Accordingly, when the aligning device is in position on the base block 10, the main axis of the channel 53 intersects the axis of the primary shaft 12 and lies at right angles to the translational axis 46. The channel 53 is of such size as to closely receive the secondary crank arm 39, as illustrated in Fig. 14, when the crank arm is disposed along the axis of the channel.

To adjust the drive mechanism, using the improved aligning device, the effective length of the secondary crank arm 39 is first set at a predetermined length by adjustment of the crank pin assembly 42. The crank pin assembly is so adjusted that the distance between the axes of the secondary shaft 37 and crank pin 43 is exactly one-fourth of the total desired amplitude of crank pin movement. The adjusting screws 19 and 34 are then loosened, and the aligning tool 48 is placed over the secondary crank arm so that the crank pin 43 is received in the opening 52 and the crank arm 39 proper is received in the guide channel 53. The adjustment block 30 and adjustment disc 17 are then manipulated until the tool 48 is moved into a position in which the dowel pins 49 drop into the openings 47 in the base block 10. At this time, and with the aligning tool 48 securely locking all parts in proper relation, the adjusting screws 19 and 34 are tightened. To this end, suitable access openings 54, 55 are provided in the aligning tool, so that the screws 34 may be tightened with the tool in place.

In the adjustment of the mechanism, after the tool 48 is placed over the crank pin 43 and secondary crank arm 39, the tool itself, as well as the adjusting block and disc 30, 17 may be used to manipulate the component into the proper adjusted relation.

One of the outstanding advantageous features of the new drive mechanism is that rotary motion may be translated into linear sinusoidally varying movement of adjustable amplitude through a system of gears and cranks in which all sliding friction is absent. Heretofore, such mechanisms as the Scotch Yoke have been utilized to convert rotary motion into sinusoidal linear motion of variable amplitude. However, the component parts of this and similar mechanisms operate in the presence of substantial sliding friction, so that it is difficult, if not impossible, to utilize such mechanism for operations requiring accuracy of a high order. On the other hand, certain devices have been employed in the past for translating rotary to linear harmonic motion without sliding parts, but such prior mechanisms have been incapable of providing adjustment of the amplitude of output motion. The present device combines the advantages of the various drives heretofore known, while avoiding the various disadvantages thereof, through a novel arrangement of crank arms and gear drives which permits of variation in the effective length of the crank arms while at all times maintaining a purely harmonic output movement directed along a single unchanged axis.

In the improved drive mechanism, means are provided for driving a secondary crank arm through a system of gears carried by a primary crank arm while providing for adjustment in the effective lengths of both crank arms. The improved mechanism is also of a highly simplified and compact nature, and permits of the use of high quality components which are not subject to appreciable friction, so that the accuracy of the drive mechanism may be maintained throughout long periods of use.

In addition to the above, the invention provides a novel and simplified device, in the nature of a jig, which is useful to assist in quickly and accurately adjusting the drive mechanism. In this respect, it is known that certain conditions and relationships between the various components must exist in order to obtain the desired linear harmonically varying output movement, and the simplified aligning device assures that such conditions and relationships will be realized in all adjusted positions of the mechanism without resort to complicated measurements.

It should be understood, however, that the form of the new drive mechanism herein illustrated and described is intended to be representative only, as many changes may be made therein without departing from the clear teachings of the invention. Accordingly, reference should be made to the following appended claims in determining the full scope of the invention.

I claim:

1. A variable displacement sinusoidal drive mechanism comprising in combination, a base block, a primary shaft supported for rotation by said base block, a primary crank arm on said primary shaft and adapted to be rotated thereby, a primary gear secured to said base block in concentric relation to said primary shaft and adapted for limited rotational adjustment about said primary shaft, an intermediate shaft supported for rotation by said primary crank arm, a first intermediate gear mounted on said intermediate shaft and meshing with said primary gear, a second intermediate gear mounted on said intermediate shaft, a support block secured to said primary crank arm and forming a part thereof, said support block being adapted for limited rotational adjustment about the axis of said intermediate shaft, a secondary shaft supported for rotation by said support block, a secondary gear mounted on said secondary shaft and meshing with said second intermediate gear, a secondary crank arm secured to said secondary shaft and adapted to be rotated thereby, a crank pin mounted on said secondary crank arm and adapted for adjustable movement toward and away from said secondary shaft, the effective length of said primary crank arm being adjustable upon rotation of said support block about the axis of said intermediate shaft to carry the axis of said secondary shaft toward or away from the axis of said primary shaft, said cranks being adjustable into predetermined initial rotational orientation upon rotation of said primary gear about the axis of said primary shaft.

2. The sinusoidal drive mechanism of claim 1, further characterized by said primary gear being mounted upon an adjustment plate, said adjustment plate having a plurality of arcuate slots therein the radii of which originate at the axis of said primary shaft, and said base block having a plurality of screws engaged therewith and received in said slots for adjustably securing said adjustment plate and primary gear.

3. The sinusoidal drive mechanism of claim 1, further characterized by said support block having a plurality of arcuate slots therein the radii of which originate at the axis of said intermediate shaft, said primary crank arm having a plurality of screws engaged therewith and received in said slots for adjustably securing said support block.

4. The sinusoidal drive mechanism of claim 1, further characterized by said secondary crank arm having a recess therein disposed along an axis intersecting said secondary shaft, said crank pin being slidably received in said recess and adapted to be secured in a pre-adjusted position therein.

5. A variable displacement sinusoidal drive mechanism comprising a primary shaft, means to support said primary shaft for rotation, a primary crank arm mounted on said primary shaft and adapted to be rotated thereby, a secondary shaft supported for rotation on said primary crank arm, a secondary crank arm mounted on said secondary shaft and adapted to be rotated thereby, means associating said primary and secondary shafts in driving and driven relation whereby rotation of said primary shaft through one revolution rotates said secondary through two revolutions with respect to said primary crank arm, and means for adjusting the effective lengths of said crank arms.

6. The sinusoidal drive mechanism of claim 5, further including means to rotatably adjust one of said crank arms with respect to the other whereby to align said secondary crank for effective motion along a predetermined axis intersecting the axis of said primary shaft.

7. The sinusoidal drive mechanism of claim 5, further characterized by said means to adjust the effective lengths of said crank arms including means movably supporting said secondary shaft on said primary crank arm whereby the axis of said secondary shaft may be moved toward or away from said primary shaft.

8. The sinusoidal drive mechanism of claim 5, further characterized by said means to adjust the effective lengths of said crank arms including means forming a crank pin connection on said secondary crank arm, and means to move said crank pin connection toward and away from the axis of said secondary shaft.

9. The sinusoidal drive mechanism of claim 5, further characterized by said means associating said primary and secondary shafts in driving and driven relation comprising an intermediate shaft supported for rotation by said primary crank arm and disposed in spaced parallel relation to said primary shaft, a normally fixed primary gear, a first intermediate gear mounted on said intermediate shaft and meshing with said primary gear, a second intermediate gear mounted on said intermediate shaft, and a secondary gear mounted on said secondary shaft and meshing with said second intermediate gear.

10. The sinusoidal drive mechanism of claim 9, further characterized by said primary crank arm including a member adapted for rotary adjustment about the axis of said intermediate shaft and supporting said secondary shaft for rotation.

11. The sinusoidal drive mechanism of claim 9, further characterized by said primary gear being adapted for rotary adjustment about the axis of said primary shaft.

12. A variable displacement sinusoidal drive mechanism comprising a primary shaft, means to support said primary shaft for rotation, a primary crank arm mounted on said primary shaft and adapted to be rotated thereby, a secondary shaft supported for rotation by said primary crank arm, a secondary crank arm mounted on said secondary shaft and adapted to be rotated thereby, means to rotate said primary shaft, means to rotate said secondary shaft in a direction opposite that of said primary shaft and at twice the speed of the latter, and means to adjust the effective lengths of said primary and secondary crank arms.

13. The sinusoidal drive mechanism of claim 12, further characterized by said means to rotate said secondary shaft comprising intermediate gearing carried by said primary crank arm.

14. The sinusoidal drive mechanism of claim 13, further including means for adjusting said intermediate gearing whereby to alter the angular relation of said primary and secondary crank arms independently of rotation of said primary shaft.

15. The sinusoidal drive mechanism of claim 12, further characterized by said secondary crank arm having crank pin mounting means and said means to adjust the effective lengths of said crank arms comprising means adjustably securing said crank pin mounting means and means adjustably connecting said primary crank arm and said secondary shaft.

16. The sinusoidal drive mechanism of claim 12, further characterized by said primary crank arm comprising a primary crank block secured in fixed relation to said primary shaft, and a support block adjustably secured to said primary crank block and mounting said secondary shaft.

17. The sinusoidal drive mechanism of claim 16, further characterized by said means to rotate said secondary shaft comprising intermediate gearing carried by said adjustment block, said adjustment block being adjustable on said primary crank block in predetermined relation to said intermediate gearing and in variable relation to said primary shaft.

18. A device for aligning and adjusting a variable displacement sinusoidal drive mechanism of the type having a base block, a primary shaft supported for rotation by said base block, a primary crank arm mounted on said primary shaft and adapted to be rotated thereby, a secondary shaft supported for rotation by said primary crank arm, a secondary crank arm mounted on said secondary shaft and adapted to be rotated thereby, means to drive said secondary shaft in a direction opposite that of said primary shaft and at twice its speed, and means to adjust the effective length of said primary and secondary crank arms, which comprises an aligning block adapted to be attached to said base block in alignment with a predetermined operating axis intersecting the axis of said primary shaft, means on said aligning block for engaging the effective outer end of said secondary crank arm and retaining said effective outer end in axial alignment with the axis of said primary shaft, and guide means adapted to engage said secondary crank arm and retain said secondary crank arm in alignment with an axis intersecting the axis of said primary shaft and lying at right angles to said predetermined axis.

19. The aligning and adjusting device of claim 18, further characterized by said aligning blocks having support portions adapted to engage said base block on opposite sides of said primary shaft, said aligning block further having a spanning portion connecting said support portions and extending over said primary shaft, said support portion having a bore therein adapted when said aligning block is in aligning position on said base block to be axially aligned with the axis of said primary shaft, said bore being adapted to receive crank pin means engaged by said secondary crank arm, and said support portion having a recess therein complementary to said secondary crank arm and adapted to receive and retain said secondary crank arm in a fixed position.

No references cited.